United States Patent
Okada et al.

(10) Patent No.: US 6,345,290 B2
(45) Date of Patent: Feb. 5, 2002

(54) CHAT SYSTEM DISPLAYING ATTRIBUTE INFORMATION, NUMBER OF STATEMENTS OR AMOUNT OF STATEMENTS IN REGISTERED CHANNEL

(75) Inventors: Sumiyo Okada; Masahiko Murakami; Yasuhide Matsumoto; Tatsuro Matsumoto; Hidenobu Ito; Hitoshi Yamauchi; Kenichi Sasaki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/159,606

(22) Filed: Sep. 24, 1998

(30) Foreign Application Priority Data

Dec. 19, 1997 (JP) ............................................. 9-351457

(51) Int. Cl.[7] .............................................. G06F 15/16
(52) U.S. Cl. ........................ 709/204; 709/203; 709/206
(58) Field of Search ................................ 709/203, 204, 709/206

(56) References Cited

U.S. PATENT DOCUMENTS

| | | | | |
|---|---|---|---|---|
| 5,737,011 A | * | 4/1998 | Lukacs | 348/15 |
| 5,793,365 A | * | 8/1998 | Tang et al. | 345/329 |
| 5,828,839 A | * | 10/1998 | Moncreiff | 709/204 |
| 5,862,330 A | * | 1/1999 | Anupam et al. | 709/204 |
| 5,987,503 A | * | 11/1999 | Murakami | 709/204 |
| 5,990,887 A | * | 11/1999 | Redpath et al. | 345/330 |
| 5,991,796 A | * | 11/1999 | Anupam et al. | 709/206 |
| 6,076,100 A | * | 6/2000 | Cottrille et al. | 709/203 |
| 6,081,830 A | * | 6/2000 | Schindler | 709/203 |
| 6,212,548 B1 | * | 4/2001 | DeSimone | 709/204 |

FOREIGN PATENT DOCUMENTS

JP 10-190729 7/1998

OTHER PUBLICATIONS

U.S. application No. 08/805,779, Murakami et al., filed Feb. 25, 1997.

* cited by examiner

Primary Examiner—Krisna Lim
(74) Attorney, Agent, or Firm—Staas & Halsey LLP

(57) ABSTRACT

When actuation of an application program is received by a client, the client is connected with a chat server and participates in and registers at a channel, and attribute information, a number of times of statements or amount of statements in the registered channel is displayed, without a user's predetermined operation and a publicly known conversation process is executed. Thereafter, when designation of the displayed attribute information, number of times of statements or amount of statements is received, a channel where statements are possible is changed into a channel relating to the designation.

26 Claims, 11 Drawing Sheets

FIG. 6

| Channel Name | Number of Users | Topic |
|---|---|---|
| #mx | 120 | |
| #ISLab | 50 | fj-wan... |
| #HILab | 28 | |
| #ume | 26 | |
| #CA | 13 | |
| #CHOCOA | 13 | |

| Nickname | Real Name | User |
|---|---|---|
| [logger] | [logger] | ~[lo |
| Boyoyon8 | Yasuyuki Matsumoto | ?yma |
| hito | Hidenobu Ito | ?hid |
| MUL | no name... | ?mul |
| MUL4 | Murakami | ?mul |
| pine | Masahiro Ma... | ?maz |
| sasakik | Kenichi Sasaki | ?sas |
| tao^-^o | Sumiyo Okada | ?sum |

CHOCOA-#CHOCOA

FILE(F) EDIT(E) SETUP(P) CHANNEL(C) COMMAND(O) URL(U) HELP(O)

1-#CHOCOA ▼ URL

11:28 xxx #CHOCOA=taotaoNT
tao-noteMUL MUL4 pine hito
sasakik yamauchi Boyoyon8
ymatsumo8 tao^-^o [logger]
tatsuro
11:40<MUL> exactly speaking
11:40<MUL> certification is
      same as HTTP
11:52<MUL> finish reading
12:14 xxx sasakik has left
IRC(EOF From client)

13:41<#ISLab:Morishita> yes
13:41<#ISLab:pine> Ishihara
put in a call
13:41<#ISLab:pine> come to
consult
13:41<#ISLab:pine> in a
conference

CHOCOA

14:29(0301) NUM

| Channel Name | Number of Users of Statements | Number of Times of Statements | Amount of Statements |
|---|---|---|---|
| #mx | 120 | 140 | 1105 |
| #ISLab | 50 | 31 | 523 |
| #HILab | 28 | 23 | 313 |
| #ume | 26 | 25 | 140 |
| #CA | 13 | 8 | 50 |
| #CHOCOA | 13 | 67 | 408 |

| Nickname | Real Name | User |
|---|---|---|
| [logger] | [logger] | ~[lo |
| Boyoyon8 | Yasuyuki Matsumoto | ~yma |
| hito | Hidenobu Ito | ~hid |
| MUL | no name... | ~mul |
| MUL4 | Murakami | ~mul |
| pine | Masahiro Ma... | ~maz |
| sasakik | Kenichi Sasaki | ~sas |
| tao^_^o | Sumiyo Okada | ~sum |

CHOCOA-#CHOCOA
FILE(F) EDIT(E) SETUP(P) CHANNEL(C) COMMAND(O) URL(U) HELP(O)

1-#CHOCOA ▶ URL

11:28 *** #CHOCOA=taotaoNT
tao-note MUL MUL4 pine hito
sasakik yamauchi Boyoyon8
ymatsumo8 tao^_^o [logger]
tatsuro
11:40<MUL> exactly speaking
11:40<MUL> certification is
same as HTTP
11:52<MUL> finish reading
12:14 *** sasakik has left
IRC(EOF From client)

13:41<#ISLab:Morishita> yes
13:41<#ISLab:pine> Ishihara
put in a call
13:41<#ISLab:pine> come to
consult
13:41<#ISLab:pine> in a
conference
CHOCOA

CHAT SYSTEM DISPLAYING ATTRIBUTE INFORMATION, NUMBER OF STATEMENTS OR AMOUNT OF STATEMENTS IN REGISTERED CHANNEL

BACKGROUND OF THE INVENTION

The present invention relates to a chat system for realizing conversation using characters, more specifically relates to a chat system having characteristics in display of attribute information of channels and a procedure for changing the channels, a chat server, a client and a computer memory product.

There exists a chat system as means for exchanging information between clients. An arrangement example of this chat system will be described based on FIG. 1. The chat system is arranged so that a chat server 1 as a host computer is connected with a plurality of clients 2 through 5 via a network 6 of a public line, and the chat server 1 transmits a message received from one of the clients 2 through 5 immediately to another clients so that conversation using characters between users who operate their clients is realized.

The aforementioned chat system displays the message, namely, a stated content and a name of the stating person correspondingly on the clients 2 through 5. Therefore, even if a plurality of users make statements simultaneously, mismatch of the stated contents and the people who made the statements is not generated on receiving sides, so it is effective for smooth progress in exchanging opinions. Moreover, since the conversation contents displayed on the clients 2 through 5 can remain as text data directly, a record can be easily created from the text data.

One embodiment of the chat system is such that one chat server is used and a plurality of channels are used. The channel represents an imaginary discourse room, and statements of another users in the discourse room can be received. A state such that the statements can be transmitted to other users is called "participations". Namely, users can join in the conversation in the channel by permitting the users to participate in the channel.

In the chat server, a statement received in a channel is transmitted only to other users participating in the channel, and thus the statement cannot be received by users participating in other channels, so independence between channels is secured.

In addition, this chat server is arranged so as to generate a new channel according to a user's requirement and to permit users, who access to the new channel after the new channel is generated, to participate in the new channel.

Attribute information such as a number of clients participating in each channel, a set topic and channel mode is given to the users who accessed to the chat server. The channel mode includes a secret mode which conceals existence of the channel from the users who don't participate in the channel, an invite only mode which permits only users who invited by the users participating in the channel to participate in the channel, and a channel key mode which permits only users who input a set password to participate in the channel.

Users select one channel based on the aforementioned information to participate in the channel. In other words, the chat system is constructed assuming that the users concentrate on the conversation in one channel.

With the spread of an Internet and intranet, opportunity to exchange information via clients has been increased, and accordingly it is required to further improve convenience of the aforementioned chat system.

"CLIENT OF A CHAT SYSTEM, CHAT SYSTEM, DISPLAY METHOD AND COMPUTER MEMORY PRODUCT OF A CHAT SYSTEM" (U.S. Ser. No. 08/805,779: hereinafter referred to as senior application), which has been suggested by the applicant of the present invention, is the invention which was devised in order to satisfy such a requirement, and it is an object of the senior application to provide a chat system which can be used for works in an office, for example.

The chat system of the senior application is arranged so that a user who does not participate in a channel can receive statements of users participating in the channel. This state is called "registration". A difference between "registration" and aforementioned "participation" is that statements of users who are permitted to "register" are not received in an objective channel. Namely, a user who is permitted to "register" at a channel can only view conversation in the channel.

More specifically, the chat system of the senior application displays conversation in a channel to which a user who operates a client pays attention, more specifically in the channel in which the user participates, and conversation in a channel at which the user registers on different areas of a display screen. Moreover, this chat system provides statement means in the channel in which the user participates. Furthermore, when the statement displayed on the display screen in the channel at which the user registers is designated by using a pointing device or the like, this chat system changes the channel in which statement is possible and permits the user to participate in the channel where the statement is made.

Therefore, a user who uses the chat system of the senior application views conversation contents in the registered channel sideways and at the same time can enjoy conversation in the participation channel. Further, in the case where the user finds statements relating to an interesting topic in the registered channel, the user designates the statements using the pointing device so as to change easily the channel in which statement is possible into the channel in which the person who is making the statement participates, and thus the user can join in the conversation.

In addition, the aforementioned chat system is arranged so that every time attribute information of each channel at which the user registers, namely, information such as a number of clients registering in the channel, a set topic and a channel mode is changed, the information is transmitted from the chat server to the client which is operated by the user.

Further, the transmitted information is stored on the client side, and the information can be displayed on a screen according to an operation by the user at any time. The displayed information is often utilized for selecting a channel at the time of changing the channel in which statement is possible.

The attribute information of the each channel, namely, information such as a number of clients registering in the channel, a set topic and a channel mode is changed as the topic changes and also as the time proceeds, but in the chat system of the senior application, predetermined operations should be performed every time the information is displayed, so an improvement in convenience of usage has been desired.

In addition, when characters are used for displaying the attribute information in the each channel, for example, topics, it is necessary to read characters which are displayed for making a distinction between topics, so conversation is interrupted during a period required for the reading.

BRIEF SUMMARY OF THE INVENTION

It is one object of the present invention to provide a chat system, chat server, client and computer memory product with which attribute information, a number of times of statements or amount of statements in a channel at which an user operating a client registers can be displayed on the client without an operation by the user.

It is another object of the present invention to provide a chat system, chat server, client and computer memory product with which attribute information, a number of times of statements or amount of statements in a channel can be displayed as images.

It is still another object of the present invention to provide a client of a chat system, chat system and computer memory product with which when displayed attribute information, number of times of statements or amount of statements is designated by using a pointing device or the like, a channel relating to the designation is changed into a channel in which statements are possible.

In the present invention from the first aspect, a name of channel which is permitted to be registered and its attribute information are displayed on each client. Therefore, since the attribute information of the channel permitted to be registered which is changed as the time proceeds is displayed, a user can know a change in the attribute information of the channel permitted to be registered without performing a special operation. Here, examples of the attribute information are a topic of the channel permitted to be registered, a channel mode of the channel permitted to be registered or a number of clients of the channel permitted to be registered, and the user can know their changes easily.

In the present invention from the second aspect, a name of channel which is permitted to be registered and a number of times or amount of statements in the channel are displayed on each client. Therefore, a user can know a change in information representing animation of conversation in the channel permitted to be registered. Moreover, a discrimination can be made between the channel where the conversation is made actively and the channel where the conversation is not active, so a channel can be selected based on the animation of conversation.

In the present invention from the third aspect, the name of the channel permitted to be registered and its attribute information in the first aspect, or the name of the channel permitted to be registered and the number of times or the amount of statements in the channel in the second aspect are displayed as images. Therefore, users can easily view the attribute information or information about the number of times or amount of statements, so a difference in the attribute information and animation of conversation between the channels can be discriminated easily.

In a chat system of the present invention from the fourth aspect, in the case where designation of the displayed attribute information, number of times of statements or amount of statements in the first or second aspect is received, the channel where statements are possible is changed into the channel relating to the designation. Therefore, the users can easily understand the operation for changing channels, and thus the users feel secure.

The above and further objects and features of the invention will more fully be apparent from the following detailed description with accompanying drawings.

BRIEF DESCRIPTION OF THE SEVERAL VIEWS OF THE DRAWINGS

FIG. 6 is an explanatory drawing showing one example of a display screen of the client according to the present invention;

FIG. 8 is an explanatory drawing showing one example of a display screen of the client according to the present invention;

DETAILED DESCRIPTION OF THE INVENTION

The following will describe the present invention on reference to the drawings showing embodiments.

Figure 1:
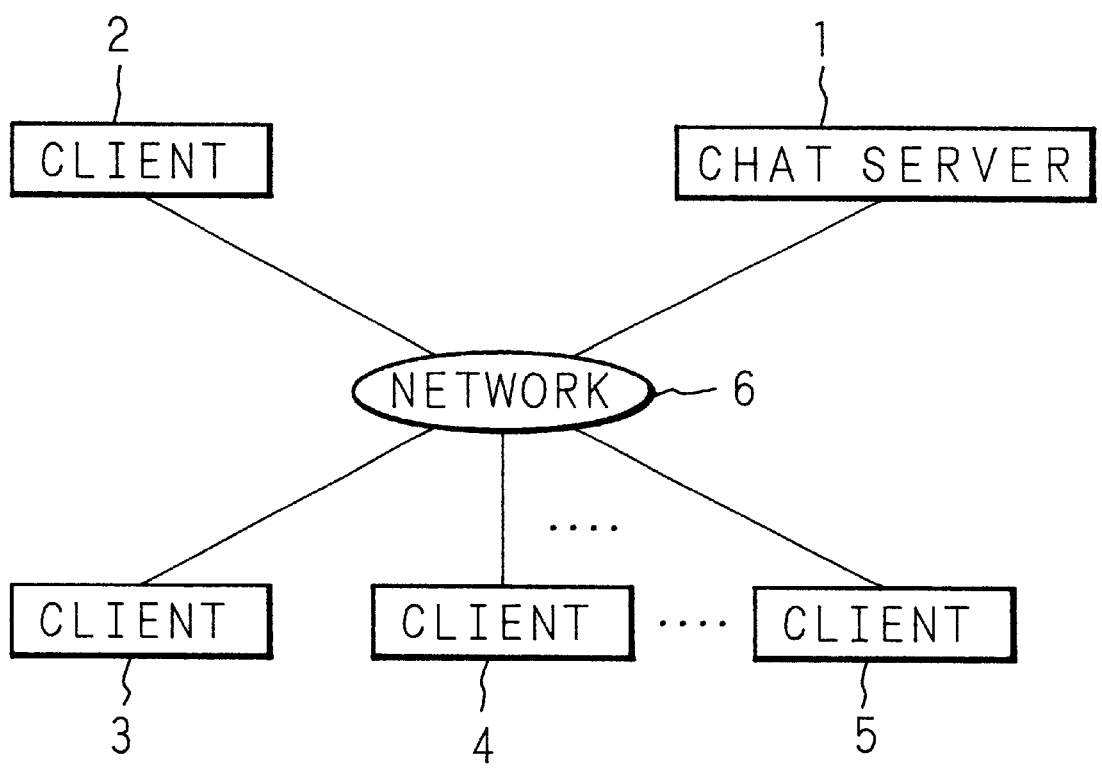
FIG. 1 is a block diagram showing an example of an arrangement of a chat system.

FIG. 1 is a block diagram showing an example of an arrangement of a chat system according to the present invention. A chat server 1 as a host computer is connected with a plurality of clients of the present invention (for example, personal computers) 2 through 5 via a network 6 of a public line. When receiving a message from one of the clients 2 through 5, the chat server 1 transmits the message to other clients immediately. This arrangement realizes conversation using characters between users who operate their clients.

Since the chat system displays stated contents and corresponding names of people who made the statements on the clients 2 through 5, even if a plurality of users make statements simultaneously, mismatch between the stated contents and the people who made the statement does not occur on a receiving side.

Figure 2:
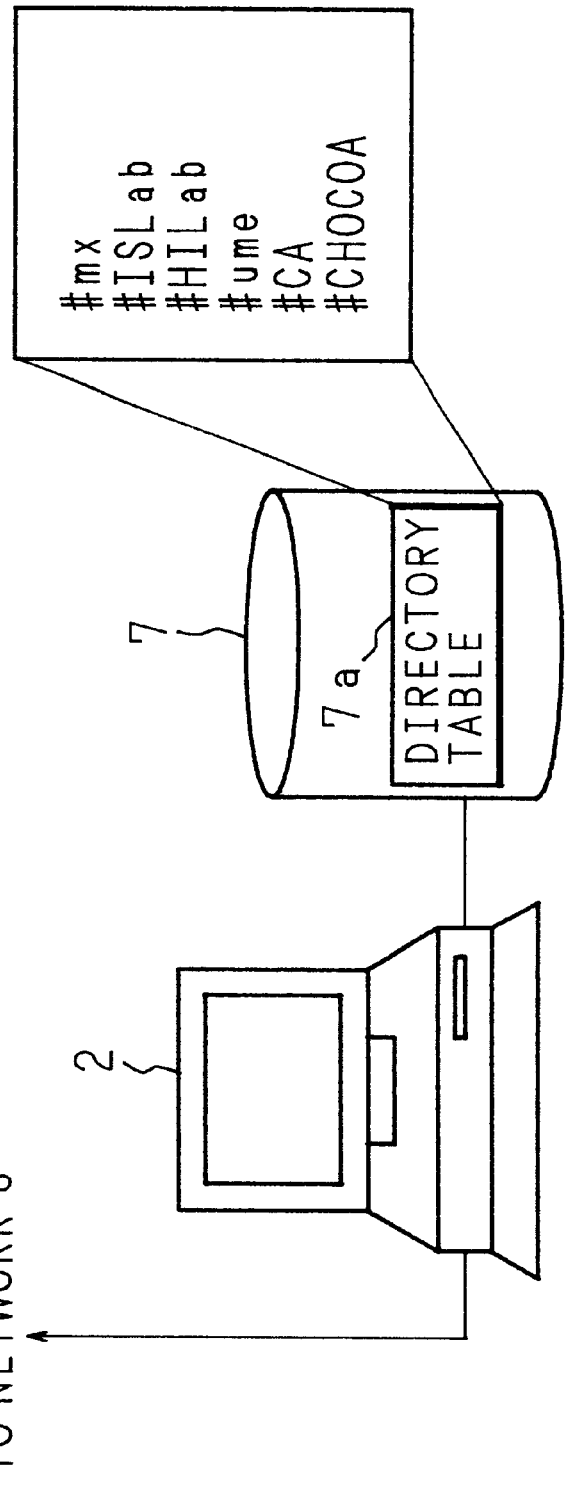
FIG. 2 is a block diagram showing an example of an arrangement of a client according to the present invention.

FIG. 2 is a block diagram showing an example of an arrangement of the client of the chat system according to the present invention. In FIG. 2, the client 2 is connected with a memory 7 composed of a hard disk device or the like, and the memory 7 stores a directory table 7a in which names of plural channels are tabulated. In the directory table 7a, names of channels are described with a format of "#" (or "&") +"a name of a channel". "#" and "&" are symbols which represent channels opened to all the servers connected with IRC networks and channels opened only to specified servers based on the IRC (Internet Relay Chat) standard.

Figure 3:
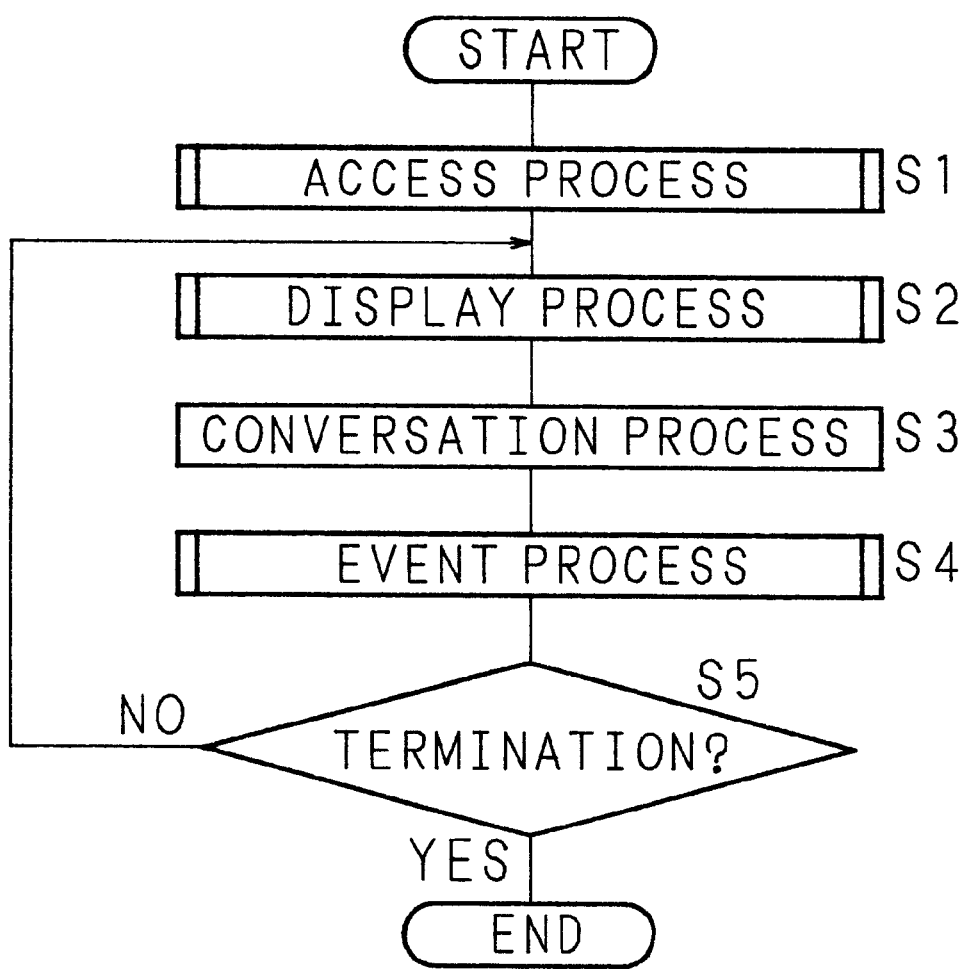
FIG. 3 is a flow chart showing a series of processing procedure in a chat system according to the present invention.

FIG. 3 is a flow chart showing a series of processing procedure in the chat system according to the present invention. When actuation of an application program of the present invention is received, connection with a chat server and participation and registration in a channel are made by an access process, mentioned later (S1). Then, attribute information, a number of times of statements or amount of statements in a channel at which a user operating a client registers is transmitted from the chat server to the client by a display process, mentioned later, so as to be displayed (S2). Moreover, publicly known conversation process for controlling transmission and receiving of statements is performed (S3).

Further, control is made by an event process, mentioned later, according to event given from input means provided to the client or the chat server (S4). A judgment is made from the given event as to whether or not the processing procedure is terminated (S5). When the processing procedure is not terminated, the procedure returns to S2 and the processes thereafter are repeated. When the judgment is made that the procedure is terminated at S5, a series of the processes is terminated.

The chat system is provided with publicly known means for changing a participation channel into another channel in a state that the user participates in a certain channel. Moreover, in the process for changing the participation channel using that means, a form of access to the channel participated before the process can be changed from "participation" into "registration". Namely, when the user participates successively in a plurality of channels using that means, the user can register at the plural channels. In this case, the channel in which the user participated at last becomes a channel in which statements are possible.

Figure 4:
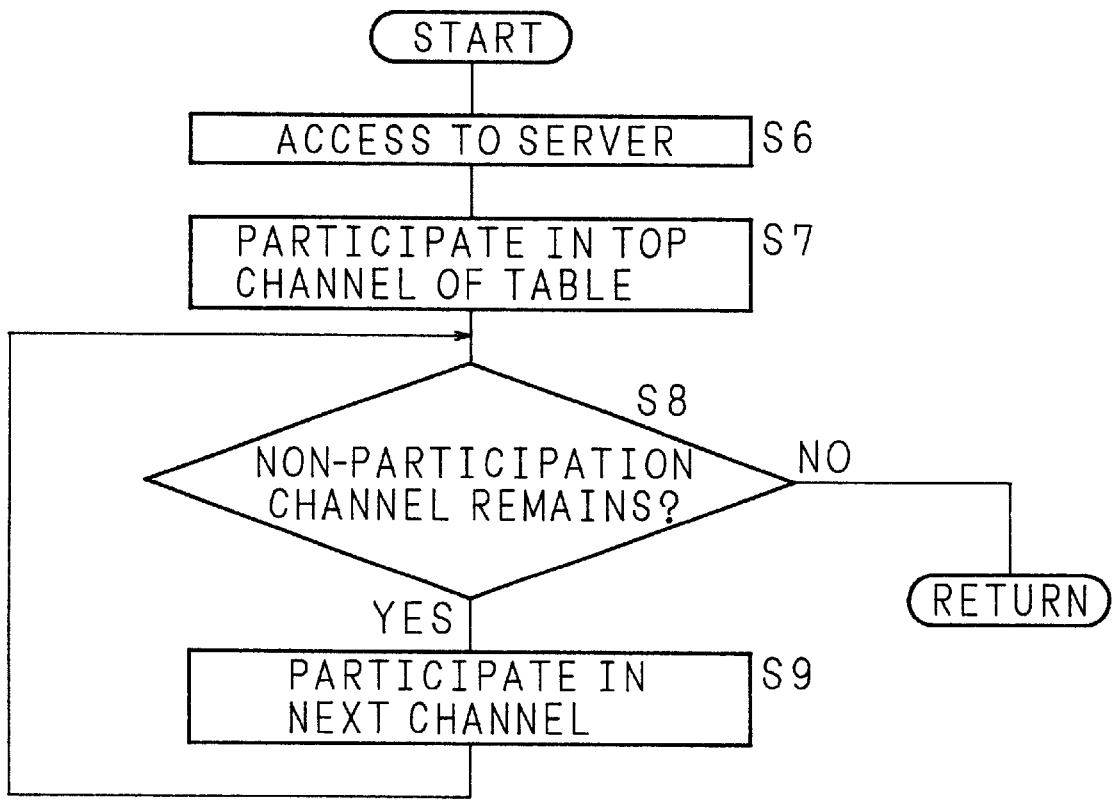
FIG. 4 is a flow chart showing an access procedure in the client according to the present invention.

FIG. 4 is a flow chart showing the access procedure (S1 in FIG. 3) in the client of the chat system according to the present invention. The client accesses to the chat server by means of publicly known access means (S6) so as to participate in a channel which is described in a top record of the directory table 7a (S7). Then, a judgment is made as to whether or not one or more channels in which the client does not participate remain in the directory table 7a (S8). When the channel remains, the client participates in a next channel via the aforementioned channel changing means, and the form of access to the channel in which the client participated before is brought into registered state (S9). The procedure returns to S8, and the processes thereafter are repeated. When the judgment is made at S8 that the channel in which the client does not participate does not remain, the access process is terminated, and the procedure returns to the source of access.

Figure 5:
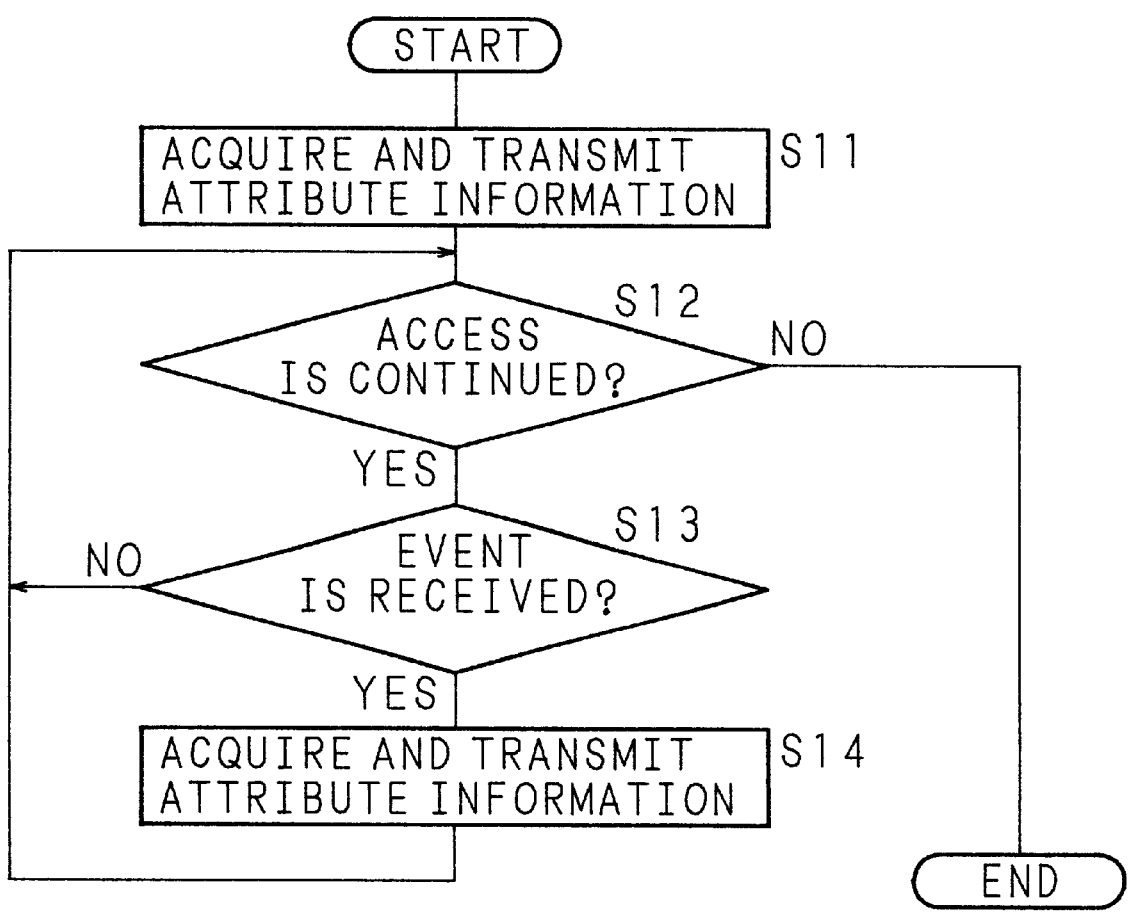
FIG. 5 is a flow chart showing a procedure for transmitting attribute information in a chat server according to the present invention.

FIG. 5 is a flow chart showing a procedure for transmitting the attribute information (S2 in FIG. 3). When the participation in and registration at the channel of the client based on the aforementioned access procedure is completed, the chat server acquires the attribute information of the channels at which the respective clients register and transmits the attribute information to corresponding clients (S11).

Next, a judgment is made as to whether or not the access state of each client to the chat server is continued (S12). When the judgment is made that the access state is continued, a judgment is made as to whether or not an event (for example, setting of topics, changing of a channel mode, new participation, etc.) relating to the change in the attribute information by means of operation by users participating in the channel is received (S13). When the event is received, the attribute information of the channel is acquired to be transmitted (S14). When the judgment is made at S12 that the access is not continued, the processing procedure is terminated. When the judgment is made at S13 that the event is not received, the procedure returns to S12, the processes thereafter are repeated.

FIG. 6 is an explanatory drawing showing one example of a display screen of the client. An area in the lower right portion in the drawing is a window W1 on which names and attribute information of channels are displayed. The window W1 is provided with, in order from left, an icon area W1a on which icons representing channel modes are displayed, a channel name area W1b on which names of channels are displayed, a number of users area W1c on which a number of clients registering at a channel is displayed, a topic area W1d on which topics are displayed, and a mode area W1e on which channel modes are displayed.

In the icons displayed on the icon area W1a, a design of a coffee cup represents that a channel mode is not set. Moreover, a design of an exclamation mark "!" represents that a secret mode is set. Further, on the mode area W1e "+s" represents a secret mode. Further, "+i" represents an invite only mode, and "+k" represents a channel key mode.

Figure 7:
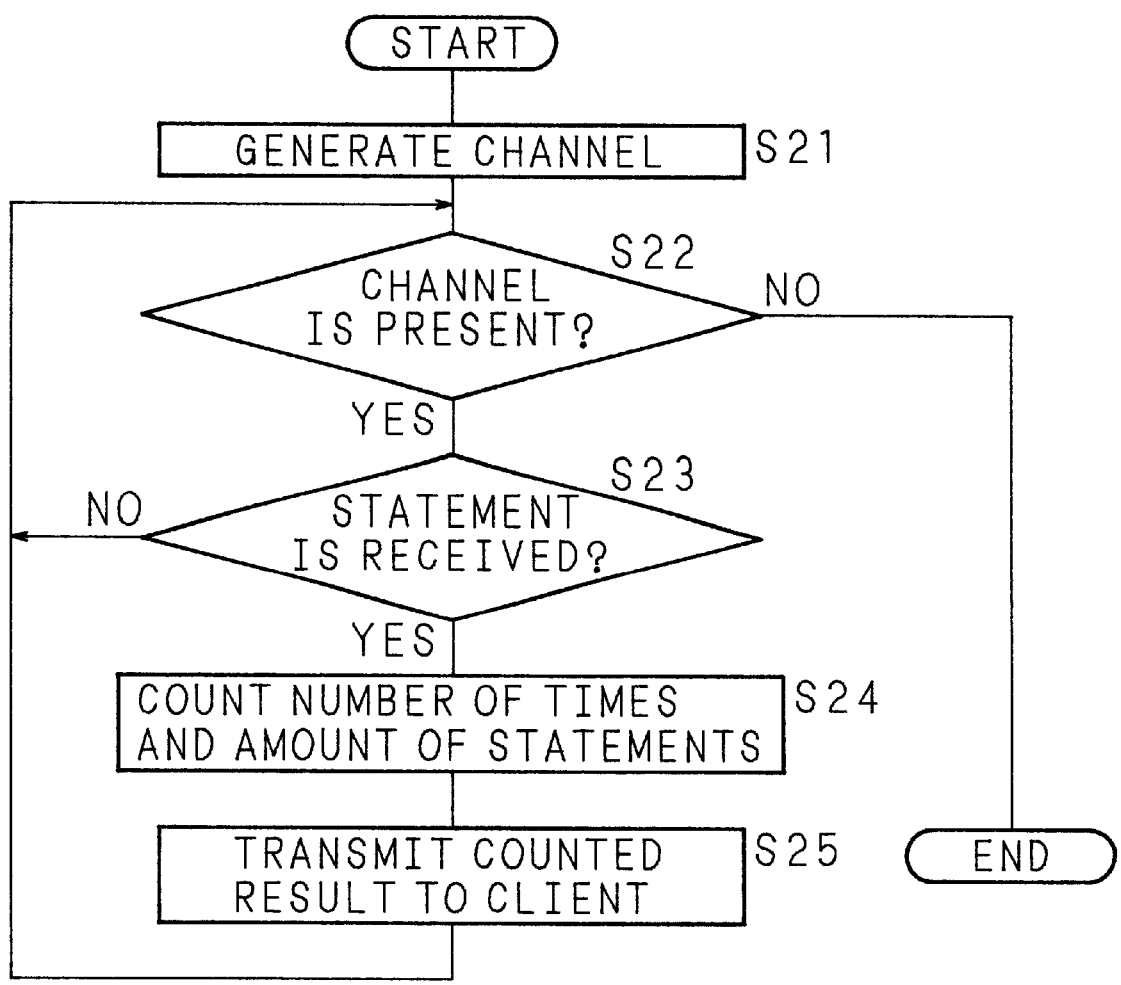
FIG. 7 is a flow chart showing a procedure for transmitting a number of times and amount of statements in the chat server according to the present invention.

FIG. 7 is a flow chart showing a procedure (S2 in FIG. 3) for transmitting a number of times and amount of statements (more specifically, a number of characters used for statements) in the chat server. A command for generating a channel is received from a client, and the channel is generated (S21).

Next, a judgment is made as to whether or not a channel presents (S22), and when a channel presents, a judgment is made as to whether or not a statement is received from a client of user who participates in the channel (S23). When the statement is received, a number of times and amount of statements including statements on that day are counted (S24), and the counted result or a predetermined image corresponding to the counted result or information which designates the image (for example, a name of an image file) is transmitted to the clients of all the users who register at the channel (S25). When the judgment is made at S22 that a channel does not present, the processing procedure is terminated. When the judgment is made at S23 that the statement is not received, and the process at S25 is terminated, the procedure is returned to S22, and the processes thereafter are repeated.

FIG. 8 is an explanatory drawing showing one example of the display screen of the client. An area on the lower right portion in the drawing is a window W2 on which names of channels, and a number of times and amount of statements are displayed. The window W2 is provided with, in order from the left, an icon area W2a on which icons representing number of times of statements are displayed, a channel name area W2b on which names of channels are displayed, a member of users area W2c on which a number of clients registering at a channel is displayed, a number of times of statements area W2d on which a number of times of statements is displayed, and a statement amount area W2e on which an amount of statements is displayed.

In the icons displayed on the icon area W2a, a design of a coffee cup represents that a number of times of statements in a channel is small. Moreover, a balloon-shaped design represents that a number of times of statements in a channel is large. Here, a predetermined threshold value is used for discriminating the number of times of statements.

Figure 9:
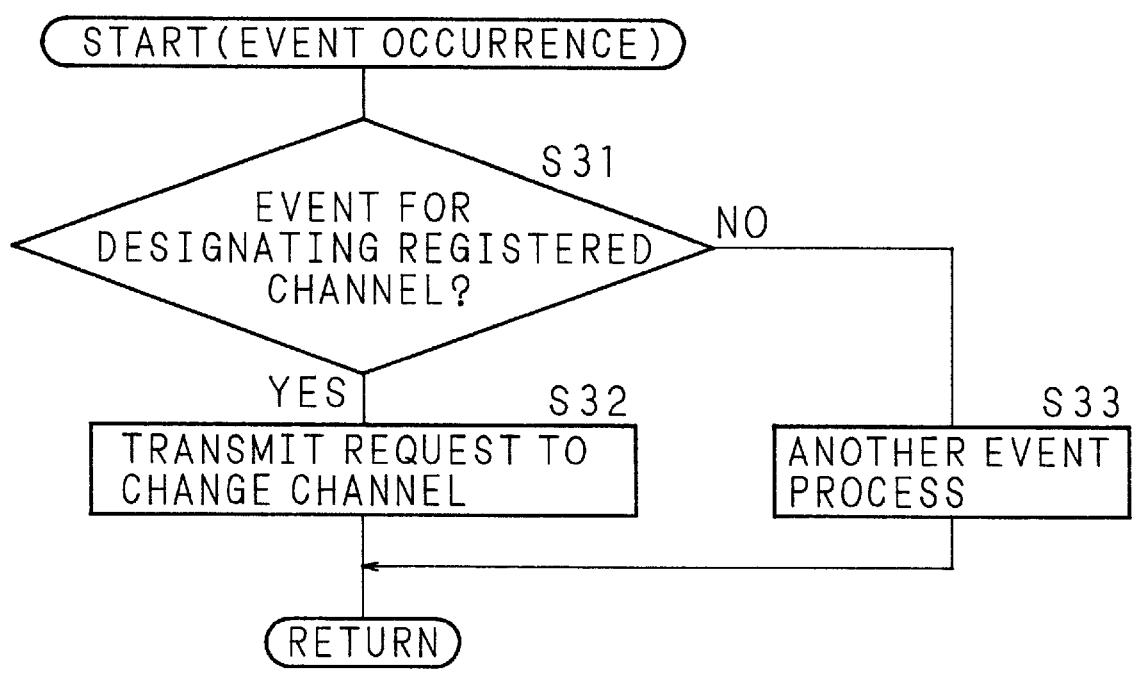
FIG. 9 is a flow chart showing a procedure for changing a channel according to the present invention.

FIG. 9 is a flow chart showing a procedure (S4 in FIG. 3) for changing a channel. When an event is received, a judgment is made as to whether or not the event is an event for designating a registered channel displayed on the display screen (S31). When the judgment is made that the received event is such an event, a request to change the channel is transmitted to the chat server so that the channel is replaced with a channel where statements are possible (S32). Then, the process for changing the channel is terminated and the procedure is returned to the source of the access, When the judgment is made at S31 that the received event is not the event for designating another channel, another event process, for example, a judgment is made as to whether or not the received event is an event for commanding to terminate the processing procedure of the chat system (S33), and the procedure is returned to the source of access.

Figure 10:
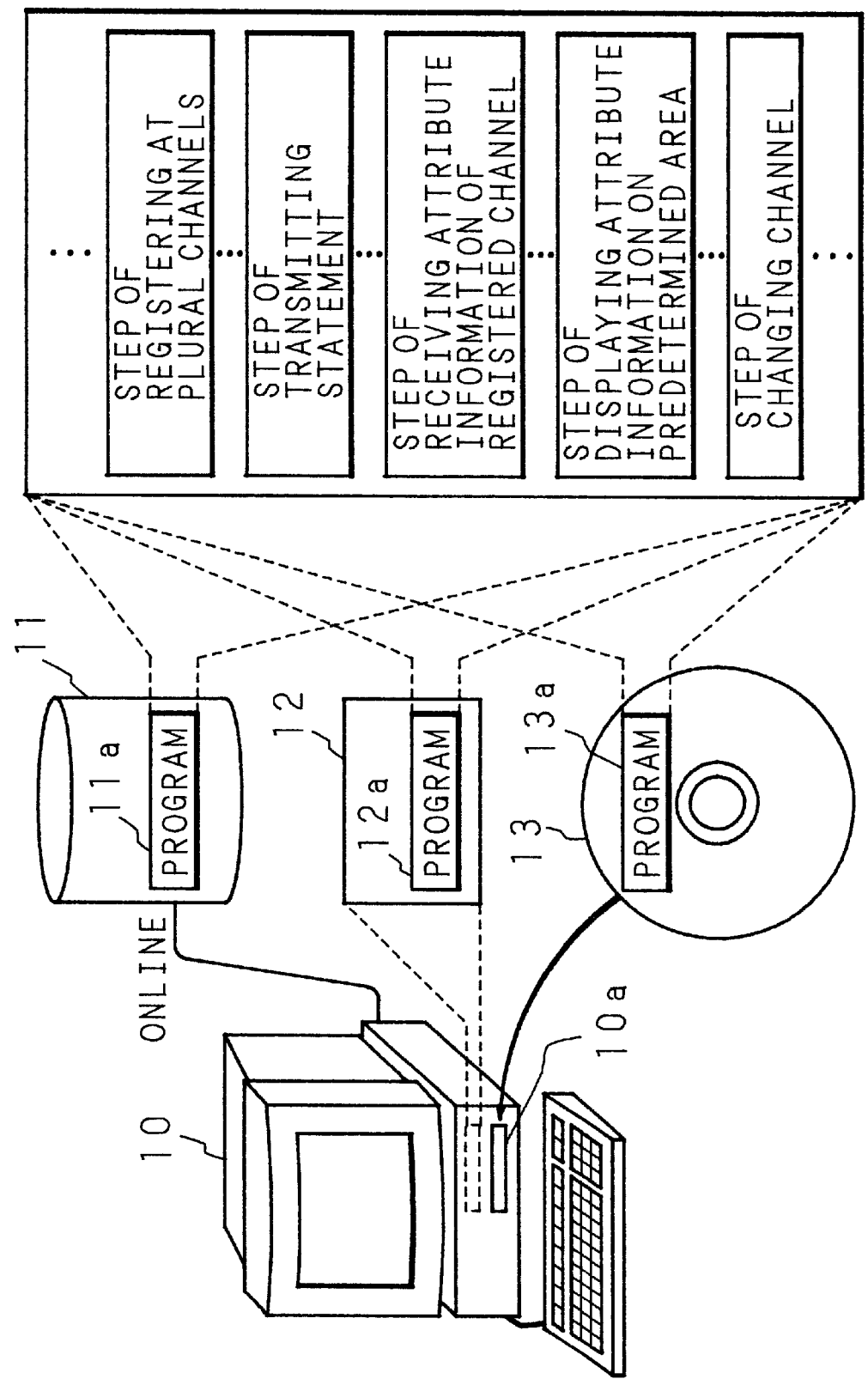
FIG. 10 is a block diagram showing an arrangement of a computer memory product according to embodiment of the present invention.

FIG. 10 is a block diagram showing an arrangement of a computer memory product according to embodiment of the present invention. A program exemplified here includes a step of accessing to the chat server so as to register at a plurality of channels, a step of transmitting a statement inputted by user operating computer which executes the program, a step of receiving attribute information of the channel at which the user registers, a step of displaying the received attribute information on a predetermined area, and a step of when designation of the displayed channel is received, changing the channel into a channel where statements are possible. This program is recorded in a computer memory product, mentioned later.

In FIG. 10, a computer memory product 11 which is on-line-connected with a computer 10 is composed of a server computer of WWW (World Wide Web), for example, installed separately from a position where the computer 10 is installed, and a program 11a like the aforementioned one is recorded in the computer memory product 11. The program 11a read out from the computer memory product 11 controls the computer 10 so that the computer 10 serves as a client of the chat system according to the present invention.

A computer memory product 12 provided in the computer 10 is composed of a hard disk drive, ROM (Read Only Memory) or the like installed in the computer 10, and a program 12a like the aforementioned one is recorded in the computer memory product 12. The program 12a read out from the computer memory product 12 controls the computer 10 so that the computer 10 serves as a client of the chat system according to the present invention.

A computer memory product 13, which is charged in a disk drive 10a provided in the computer 10, is composed of a portable magneto-optical disk, CD-ROM, flexible disk or the like, and a program 13a like the aforementioned one is recorded in the computer memory product 13. The program 13a read out from the computer memory product 13 controls the computer 10 so that the computer 10 serves as a client of the chat system according to the present invention.

Figure 11:
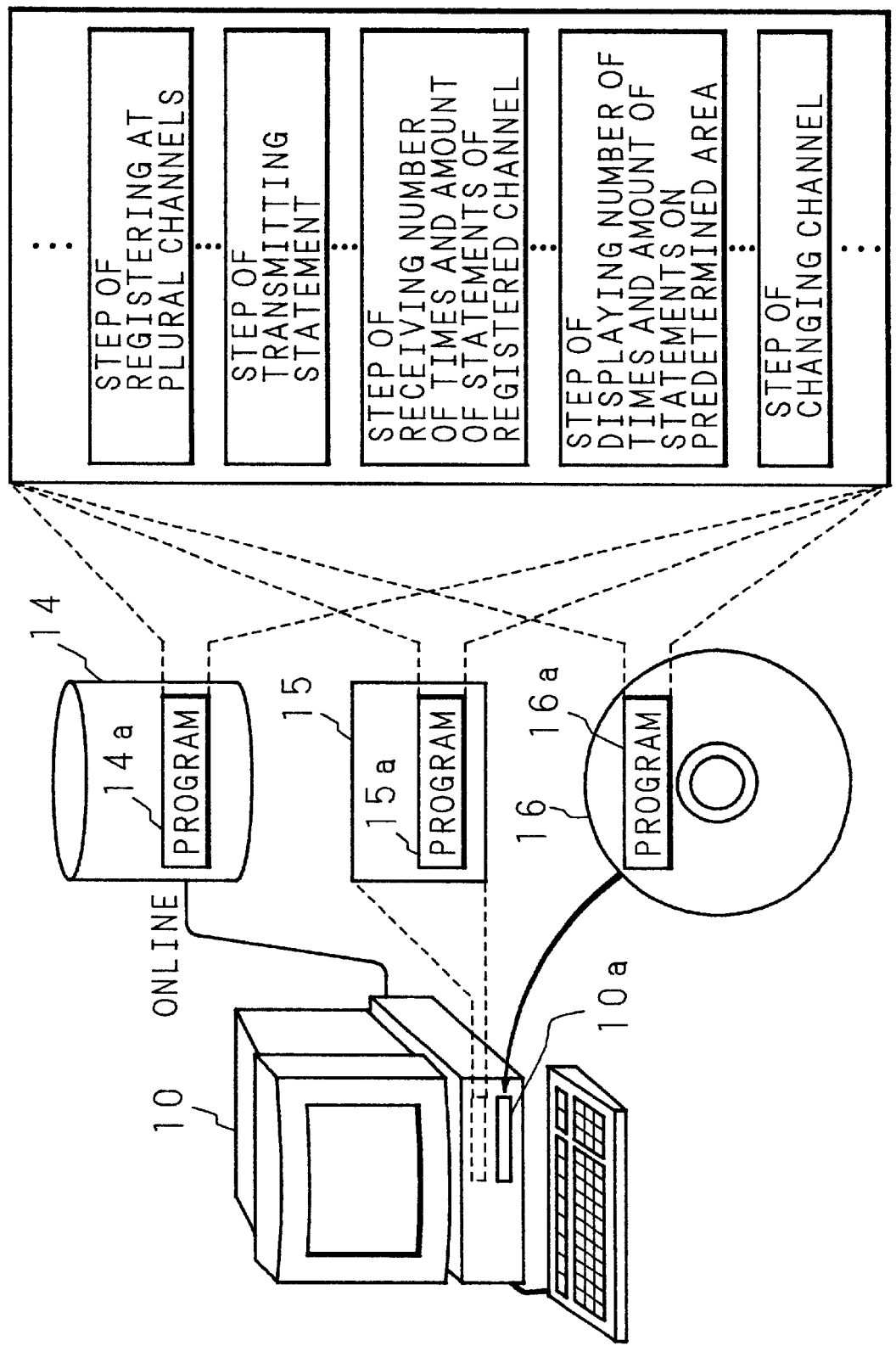
FIG. 11 is a block diagram showing an arrangement of the computer memory product according to embodiment of the present invention.

FIG. 11 is a block diagram showing an arrangement of a computer memory product according to embodiment of the present invention. A program exemplified here includes a step of accessing to the chat server so as to register at a plurality of channels, a step of transmitting a statement inputted by user operating computer which executes the program, a step of receiving a number of times and amount of statements in the channel at which the user registers, a step of displaying the received number of times and amount of statements on a predetermined area, and a step of when designation of the displayed channel is received, changing the channel into a channel where statements are possible. This program is recorded in a computer memory product, mentioned later.

In FIG. 11, a computer memory product 14 which is on-line-connected with the computer 10 is composed of a server computer of WWW, for example, installed separately from the position where the computer 10 is installed, and a program 14a like the aforementioned one is recorded in the computer memory product 14. The program 14a read out from the computer memory product 14 controls the computer 10 so that the computer 10 serves as a client of the chat system according to the present invention.

A computer memory product 15 provided in the computer 10 is composed of a hard disk drive, ROM or the like installed in the computer 10, and a program 15a like the aforementioned one is recorded in the computer memory product 15. The program 15a read out from the computer memory product 15 controls the computer 10 so that the computer 10 serves as a client of the chat system according to the present invention.

A computer memory product 16, which is charged in the disk drive 10a provided in the computer 10, is composed of a portable magneto-optical disk, CD-ROM, flexible disk or the like, and a program 16a like the aforementioned one is recorded in the computer memory product 16. The program 16a read out from the computer memory product 16 controls the computer 10 so that the computer 10 serves as a client of the chat system according to the present invention.

As mentioned above, in the present invention, since the attribute information, the number of times of statements or amount of statements in the channel where registration is permitted, which changes as the time proceeds, is displayed, a user can know a change in the information without any operation. Moreover, since the information is represented by predetermined images, the user can easily discriminate the attribute information, the number of times of statements or amount of statements in the channel. Further, since the channel, which is received by designating the attribute information, the number of times of statements or amount of statements, is replaced with a channel where statements are possible, there is an effect that the operation becomes easy, and thus the user feels secure.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A chat system, comprising:
   a chat server using a plurality of channels;
   a plurality of clients connected with said chat server;
   means for displaying a conversation in each channel on a client registering at the channel;
   means for receiving a statement from each client into the channel in which the client participates; and
   means for displaying a name of the channel registered by each client and its attribute information, which is changed as time proceeds, on each client without an operation by a user assigned to each client.

2. The chat system according to claim 1, wherein the attribute information is one selected from the group consisting of a topic set by the channel, a channel mode set by the channel and a number of clients registering at the channel.

3. The chat system according to claim 1, wherein the attribute information is an image representing a topic, a channel mode or a number of clients set by the channel.

4. The chat system according to claim 1, further comprising:

means for receiving an input of channel by designating the name of the channel or its attribute information displayed on the client; and means for permitting the client to participate in the inputted channel.

5. A chat system, comprising:

a chat server using a plurality of channels;

a plurality of clients connected with said chat server;

means for displaying a conversation in each channel on a client registering at the channel;

means for receiving a statement from each client into the channel in which the client participates;

means for counting a number of times or amount of statements in each channel; and means for displaying a name of the channel registered by each client and the counted number of times or amount of statements on the client without an operation by a user assigned to each client.

6. The chat system according to claim 5, wherein the number of times or amount of statements is displayed as an image.

7. The chat system according to claim 6, further comprising:

means for receiving an input of channel by designating the name of the channel, the number of times of statements or amount of statements displayed on said clients; and means for permitting the client to participate in the inputted channel.

8. A chat server connecting a plurality of clients and using a plurality of channels, comprising:

means for transmitting a conversation in each channel to a client registering at the channel;

means for receiving a statement received from each client into the channel in which the client participates; and means for transmitting a name of the channel registered by each client, and an image representing a topic, a channel modes or a number of clients set by the channel or information designating the image to the client without an operation by a user assigned to each client.

9. A chat server connecting a plurality of clients and using a plurality of channels, comprising:

means for transmitting a conversation in each channel to a client registering at the channel;

means for receiving a statement received from each client into the channel in which the client participates;

means for counting a number of times or amount of statements in each channel; and means for transmitting a name of the channel registered by each client and the counted number of times or amount of statements to the client without an operation by a user assigned to each client.

10. The chat server according to claim 9, wherein the number of times of statements or amount of statements is transmitted as an image or information designating the image.

11. A client connected with a chat server using a plurality of channels, comprising:

means for receiving and displaying a conversation in the channel which is permitted to be registered by the chat server;

means for transmitting a statement to the channel in which participation is permitted by the chat server;

means for receiving a name of the channel which is permitted to be registered and its attribute information from the chat server; and means for displaying the received name of the channel and its attribute information, which is changed as time proceeds, without an operation by a user assigned to the client.

12. The client according to claim 11, wherein the attribute information is one selected from the group consisting of a topic set by the channel, a channel mode set by the channel and a number of clients registering at the channel.

13. The client according to claim 11, wherein the attribute information is an image representing a topic, a channel mode or a number of clients set by the channel.

14. The client according to claim 11, further comprising:

means for receiving an input of the channel by designating the displayed name of the channel or its attribute information; and means for requesting permission to participate in the inputted channel to the chat server.

15. A client connected with a chat server using a plurality of channels comprising:

means for receiving and displaying a conversation in the channel which is permitted to be registered by the chat server;

means for transmitting a statement to the channel in which participation is permitted by the chat server;

means for receiving a name of the channel which is permitted to be registered and a number of times or amount of statements in the channel from the chat server; and means for displaying the received name of the channel and number of times or amount of statements without an operation by a user assigned to the client.

16. The client according to claim 15, wherein the number of times or amount of statements is displayed as an image.

17. The client according to claim 15, further comprising:

means for receiving an input of the channel by designating the displayed name of the channel, number of times of statements or amount of statements; and means for requesting permission to participate in the inputted channel to the chat server.

18. A computer memory product having machine readable program code means for causing a computer to execute a process, said machine readable program code means comprising:

a program code for causing the computer to connect a chat server using a plurality of channels with the computer;

a program code for causing the computer to receive and display a conversation in the channel which is permitted to be registered by the chat server;

a program code for causing the computer to transmit a statement to the channel in which participation is permitted by the chat server;

a program code for causing the computer to receive a name of the channel which is permitted to be registered and its attribute information; and a program code for causing the computer to display the received name of the channel and its attribute information, which is changed as time proceeds, without an operation by a user assigned to the computer.

19. The computer memory product according to claim 18, wherein the attribute information is one selected from the group consisting of a topic set by the channel, a channel mode set by the channel and a number of clients registering at the channel.

20. The computer memory product according to claim 18, wherein the attribute information is an image representing a topic, a channel mode or a number of clients set by the channel.

21. The computer memory product according to claim 18, said machine readable program code means further comprising:

a program code for causing the computer to receive an input of the channel by designating the displayed name of the channel or its attribute information; and a program code for causing the computer to request permission to participate in the inputted channel to the chat server.

22. A computer memory product having machine readable program code means for causing a computer to execute a process, said machine readable program code means comprising:

a program code for causing the computer to connect a chat server using a plurality of channels with the computer;

a program code for causing the computer to receive and display a conversation in the channel which is permitted to be registered by the chat server;

a program code for causing the computer to transmit a statement to the channel in which participation is permitted by the chat server;

a program code for causing the computer to receive a name of the channel which is permitted to be registered and a number of times or amount of statements in the channel; and a program code for causing the computer to display the received name of the channel and number of times or amount of statements without an operation by a user assigned to each client.

23. The computer memory product according to claim 22, wherein the number of times or amount of statements is displayed as an image.

24. The computer memory product according to claim 22, said machine readable program code means further comprising:

a program code for causing the computer to receive an input of channel by designating the displayed name of the channel, number of times or amount of statements in the channel; and a program code for causing the computer to request permission to participate in the inputted channel to the chat server.

25. A system, comprising:

client computers connected to a network; and a chat server computer connected to the network and using channels to display a conversation in each channel on a client computer registering at the channel, displaying channel attribute information as images on the client computer without a user input, and receiving from the client a channel designation according to the channel attribute information from the user to participate in the designated channel.

26. The system according to claim 25, wherein the chat server counts statements of the conversation in each channel as the attribute information.

\* \* \* \* \*